UNITED STATES PATENT OFFICE.

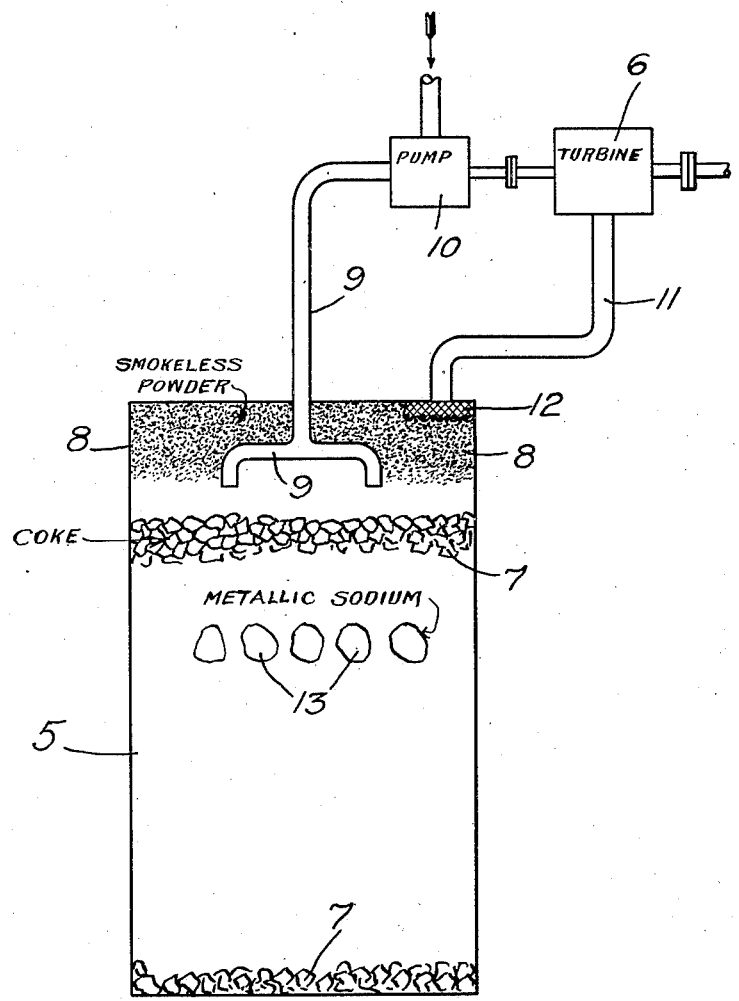

ALEXANDER T. KASLEY, OF PHILADELPHIA, PENNSYLVANIA, ASSIGNOR TO WESTINGHOUSE ELECTRIC & MANUFACTURING CO., A CORPORATION OF PENNSYLVANIA.

PRESSURE GENERATOR.

1,423,330.　　　　Specification of Letters Patent.　　Patented July 18, 1922.

Application filed November 16, 1918. Serial No. 262,914.

*To all whom it may concern:*

Be it known that I, ALEXANDER T. KASLEY, a citizen of the United States, and a resident of Philadelphia, in the county of Philadelphia and State of Pennsylvania, have made a new and useful Invention in Pressure Generators, of which the following is a specification.

This invention relates to pressure generators and has for an object to produce a new and improved apparatus for and method of generating pressure.

A further object is to produce a new and improved pressure generator which is well adapted for producing fluid under pressure for power or other purposes, in places where the supply of air is limited.

A further object is to produce a new and improved pressure generator which produces fluid under pressure through the reaction between an oxygen bearing material and a fuel, and in which the combustion is promoted by the heat of combustion.

A further object is to produce a new and improved method of generating pressure which consists in chemically uniting a solution of ammonium nitrate ($NH_4NO_3$) and potassium nitrate ($KNO_3$) in water (or any other suitable oxygen bearing solution or material) and coke (or other suitable carbon bearing material), and in promoting the chemical action by means of heat.

A further object is to produce a new and improved pressure generator in which means are provided for generating an initial pressure which is utilized in bringing together a fuel and oxygen bearing material and in which means are provided for generating initial heat for promoting chemical action between the fuel and the oxygen bearing material.

These and other objects are attained by means of a pressure generator and the method of generating pressure embodying the features of my invention herein described and illustrated in the drawing accompanying and forming a part hereof.

My invention contemplates a pressure generator and method of generating pressure which is preferably independent of a supply of oxygen from the air and is therefore well adapted to be employed in submarines, torpedoes, mines, and other places where the supply of air is limited. It may, however, be used in any place or for any purpose requiring a supply of fluid under pressure. In carrying out my invention I preferably employ inexpensive materials which will combine readily without necessarily receiving oxygen from the atmosphere and which will produce fluids under pressure suitable for power generation or other purposes. For example, coke and a solution of ammonium nitrate ($NH_4NO_3$) in water may be employed to produce vapors and gases suitable for power purposes. As the chemical action is promoted by heat, I preferably employ means for initially heating one or both of the materials and thereafter employ a part of the heat generated by the chemical action between the materials for promoting the reaction.

The drawing is a diagrammatic sectional view of a pressure generator embodying the features of my invention.

As shown in the drawing, I have provided a closed combustion chamber 5, in which pressure is generated and which is adapted to deliver suitable motive fluid under pressure to an engine or turbine 6. As shown, the chamber 5 is nearly filled with coke 7, which serves both as a fuel and a refractory heat storing and transmitting material. Above the coke 7 and in the top of the chamber 5, I have shown a layer of smokeless powder 8, which is provided for the purpose of producing an initial pressure in the generator. In the illustrated embodiment of my invention, ammonium nitrate solution is adapted to be delivered to the coke within the chamber 5 by means of a conduit and distributing pipe 9, which extends within the chamber 5. As illustrated, the nitrate solution is pumped into the chamber 5 through the conduit 9 by means of a pump 10. The pump 10 is preferably driven by the engine or turbine 6 and, as shown, is directly connected thereto. The engine or turbine 6 receives motive fluid from the chamber 5 through a conduit 11, the inlet of which, as shown, is protected by a suitable strainer 12, for preventing solid material being carried over into the engine by the products of combustion.

Imbedded in the coke 7, I have illustrated several pieces of metallic sodium 13, which are provided for the purpose of causing a rapid initial heating of the coke when the nitrate solution is forced into the chamber 5 by the pump 10. Any suitable heating means may be provided, although the use of metallic sodium provides a simple and inexpensive method of furnishing initial heat to start a rapid chemical action between the nitrate solution and the coke.

In operation the apparatus illustrated is preferably started up by igniting the powder charge 8 in the top of the chamber 5. This generates sufficient pressure to start the engine or turbine 6 and thereby causes the pump 10 to force the nitrate solution into the chamber 5. The sodium 13 immediately combines exothermally with the solution, or at least with the water, and thereby heats up the surrounding coke. Chemical action takes place rapidly between the solution and the hot coke, and as this action is also exothermal it is self-supporting. The metallic sodium is only provided as a heat starter. The products of combustion and steam, generated by the intense heat of the chemical action, pass through the conduit 11 and drive the engine or turbine 6.

In the illustrated embodiment of my invention, the powder 8 is the pressure starter and the metallic sodium 13 the heat starter. Either of these may be omitted or changed, as required for various classes of work.

The apparatus illustrated is well adapted for use in torpedoes. When so used the smokeless powder and metallic sodium as described and illustrated furnish convenient, simple and inexpensive starting means for the generator. The solution employed is preferably a saturated solution of ammonium nitrate ($NH_4NO_3$) and potassium nitrate ($KNO_3$) in water. Coke acts both as a fuel and as a refractory material for heating the incoming solution. If desirable, a separate refractory heat storing and transmitting material may be provided to promote the chemical action.

While I have described and illustrated but one embodiment of my invention, it will be apparent to those skilled in the art that various changes, modifications, additions and omissions may be made in the apparatus described and illustrated without departing from the spirit and scope of the invention, as set forth by the appended claims.

What I claim is:

1. In a pressure generator, a closed combustion chamber containing a fuel, means for delivering an oxygen bearing solution to the fuel, and means for initially heating the fuel in response to an influx of solution.

2. In a pressure generator, a closed combustion chamber containing a fuel, means for delivering an oxygen bearing solution to the fuel, means for initially heating the fuel in response to an influx of solution, and means for producing an initial pressure in the combustion chamber.

3. The method of generating pressure which consists in chemically uniting a refractory solid fuel and an oxygen bearing liquid in a closed chamber, and in employing a part of the heat generated in promoting the chemical reaction.

4. The method of generating pressure which consists in chemically uniting coke and a nitrate solution in a closed chamber, and in employing a part of the heat generated in promoting the chemical action.

5. The method of generating pressure in a closed chamber containing fuel, which consists in forcing an oxygen bearing liquid into said chamber, and initially heating the chamber by subjecting metallic sodium within the chamber to the said liquid.

In testimony whereof, I have hereunto subscribed my name this 12th day of November, 1918.

ALEXANDER T. KASLEY.

Witnesses:
CHARLES F. MILLER.
J. H. HALE.